J. H. DAVIS.
ADJUSTING DEVICE FOR BELTS.
APPLICATION FILED APR. 17, 1918. RENEWED NOV. 5, 1920.
1,385,309.
Patented July 19, 1921.
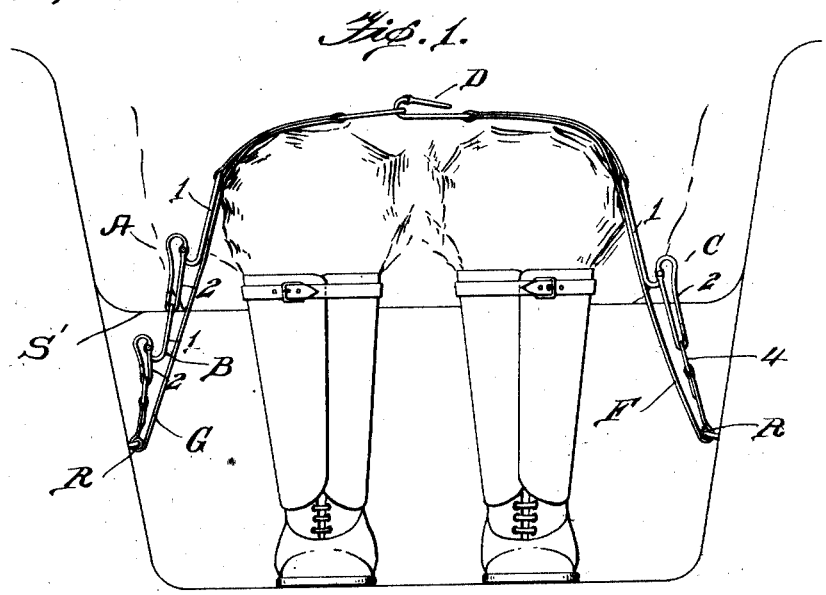
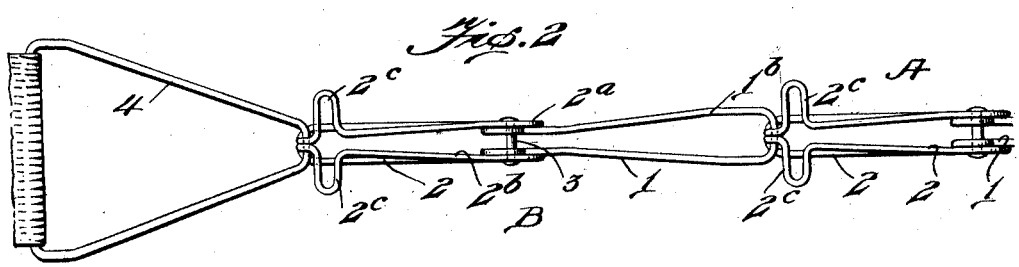
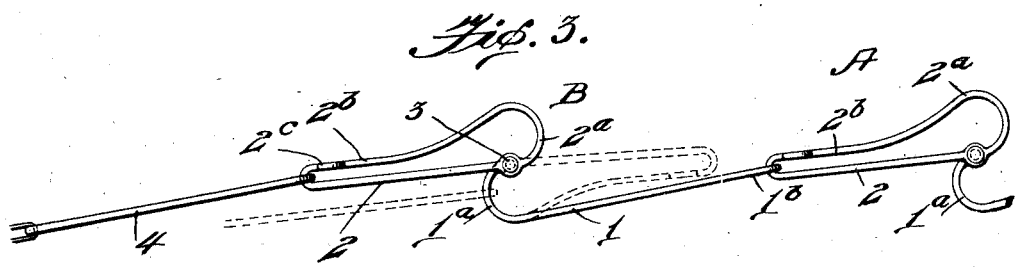
Inventor
John H. Davis
By Alexander Dowell
Attorneys

UNITED STATES PATENT OFFICE.

JOHN H. DAVIS, OF NEW YORK, N. Y.

ADJUSTING DEVICE FOR BELTS.

1,385,309.   Specification of Letters Patent.   Patented July 19, 1921.

Application filed April 17, 1918, Serial No. 229,122. Renewed November 5, 1920. Serial No. 422,075.

*To all whom it may concern:*

Be it known that I, JOHN H. DAVIS, a citizen of the United States, residing at New York, in the county of New York and State of New York, have invented certain new and useful Improvements in Adjusting Devices for Belts; and I hereby declare that the following is a full, clear, and exact description thereof, reference being had to the accompanying drawings, which form part of this specification.

The object of this invention is to provide a simple, efficient and safe means for rapidly and quickly adjusting (lengthening or shortening) the safety band or harness used in flying machines to secure aviators therein and prevent their accidentally falling out in maneuvering the machine. Bands adjustable by means of buckles have been used but these require a good deal of time for adjustment, and time is of very great importance particularly on the practice fields where when a machine comes in and one aviator gets out and another takes his place, as the belts have to be loosened to enable the aviator to get out and the next aviator get in and as he may be larger or smaller the belt may require considerable adjustment.

My invention enables each aviator to quickly adjust the belt so as to fasten himself safely in the machine and quickly release himself when he wishes to leave the machine, and at the same time be secured in the machine while flying.

The invention consists in the novel construction of adjustable links for the safety belt, and the accompanying drawings illustrate a belt with such take up devices and I will describe the invention with reference thereto and summarize the same in the claims.

In said drawings:

Figure 1 is a front view indicating the mode of using a belt having such take up devices.

Fig. 2 is an enlarged plan view of some of the adjusting devices of such belt.

Fig. 3 is a side view of Fig. 2 showing one of the adjusting devices extended in full lines and contracted in dotted lines.

The main portions F and G of the belt may be of any suitable material, either metal, leather or fabric. The opposite sections of the belt may be engaged in the usual manner with rollers R secured (in the example indicated) to opposite sides of the fuselage or car of an aeroplane adjacent the seat S', whereon the pilot or passenger is seated; and the meeting ends of the two sections of the belt may be detachably connected at center by any suitable catch D preferably such as is now commonly employed in aeroplanes in order that they may be quickly fastened when the pilot gets into the machine, or unfastened when he wishes to get out of it.

By my invention I save time and facilitate adjustment of the belt, and at the same time insure that it will be safe and secure at all times.

I provide the belt with a plurality of adjustable devices indicated at A, B, C, in the drawings each of which can be turned one way to lengthen the belt and the opposite way to shorten it. Preferably I make the adjusting devices alike but varying in length so that the amount of taking up or letting out of the belt can be quickly varied as required. Each adjusting device, *per se*, comprises a hook-member 1 and a take-up link member 2. These members may be made of wire or other suitable material.

As shown the hook member 1 has a hook $1^a$ at one end, and its other end is adapted to be engaged with another link member or other part of the belt; according to whether one or more of the adjusting devices are to be linked up or connected in series. These adjusting devices themselves form a part of the belt. One end $2^a$ of the take-up link member 2 is bent on a curve corresponding with the hook $1^a$, and is pivotally connected to the extremity of hook $1^a$ by a pin 3, or other suitable means, so that the link member 2 can be turned on said pivot into a position parallel with the hook member 1, as indicated in dotted lines in Fig. 3, when it is desired to shorten the retaining device and belt; or the link member 2 may extend substantially in line with the hook member 1, as shown in full lines in Fig. 3 when it is desired to lengthen or extend the belt. The other end of link member 2 is preferably contracted as at $2^b$.

An ordinary link 4 may be engaged with the link member 2, as indicated in Fig. 1; or in place of link 4 the hook-member of an adjusting device B may be used as in Fig. 3; or link 4 may slidably engage link 2 at one end and have its other end suitably shaped for attachment to the adjacent part of the belt.

As shown when the belt is extended the link 4 is engaged with the end of link member 2 farthest removed from hook 1ª, (as shown in full lines Fig. 3); and if it is desired to shorten the belt, the link member is grasped and turned on pivot 3 as a hinge until the link member 2 assumes the position shown in dotted lines in Fig. 3. In so turning the link member 2 the link 4 is caused to move along the inner leg of the link member 2 toward hook 1ª, and eventually to slip over pivot 3 and down into engagement with hook 1ª; the link 4 then being securely engaged directly with hook 1ª, and holding the link member 2 lapped over the hook member 1 as shown in dotted lines in Fig. 3. This adjustment shortens the length of the belt.

When the link member is turned from the dotted position in Fig. 3 back to full position, the link 4 is disengaged from hook 1ª and moves back to the far end of link member 2, thus lengthening the belt an amount equal to the length of the link member as indicated in full lines Fig. 3. The pivot 3 connecting link member 2 and hook member 1 should be such that the link 4 will not be caught thereon in adjusting link 2.

As shown the hook member 1 may be formed of a stout wire bent upon itself to form a major loop at one end, and the extremities of the wire at the other end of the hook member are bent into parallel hook portions, as indicated at 1ª, said hook portions being transfixed by the pivot pin 3.

The link-member 2 may similarly be formed of a stout metal wire bent upon itself to form opposite similar side members 2ᵇ, which are pivoted at one end on pin 3, preferably both said side members being embraced or engaged by the link 4 (as indicated in Fig. 2).

In order to facilitate manipulation of the link members 2, and swinging of same over or away from the hook members; I preferably provide each link member 2 with a projecting handle or finger piece at the end removed from pivot 3; which handle projects so that it can be readily engaged by the hand or fingers. This handle may be of any suitable kind and form. As shown in Fig. 2 it can be made by forming minor laterally projecting return bends 2ᶜ in the side members 2ᵇ, see Fig. 2, which provide a neat and convenient means for manipulating the link member.

In the example shown in Fig. 1 I use two such connected take-up devices indicated at A and B on the right hand side of the belt, said devices being preferably of different lengths; and the hook member 1 of device B engaging the link member 2 of device 1, and acting like link 4. A third similar connecting device, indicated at C may be used at the left hand side of the belt; device C can be larger than devices A and B. Of course the number and sizes of the take-up devices can be varied to suit, but sufficient take-up devices should be provided in each belt to enable the pilot or person entering the machine to quickly take up or let out the belt sufficiently to suit himself, and fulfil the requirements of safety.

The pilots frequently change, particularly in training camps, where as soon as one student gets out of the machine another takes his place, and it is important to make the changes rapidly to economize time and enhance the utility or service of the machines.

The pilots of course vary in size; and as it is essential for safety that the belt be properly adjusted to hold the pilot in his seat, it is necessary to adjust the belt for each different person using the machine. A stout man may be followed by a thin one, or vice versa and with belts as heretofore constructed a great deal of valuable time has been heretofore necessarily wasted in adjusting the belt.

The pilot can enter the machine connect the sections of the belt by engaging retainer D, and then as the machine rises he can adjust the belt to suit himself with either hand by adjusting one or more of the link members as desired to take up or loosen the belt until it is comfortably and safely adjusted.

What I claim is:

1. In a device of the type described, an adjustable take-up device comprising a hook member and a closed link member pivoted to the end of the hook member and a link slidably engaging the link member; said hook member being adapted to be connected at its free end with one part of a belt, and the link being adapted to be connected with another part of the belt; said link member when in one position forming a link of the belt and extending same, and when turned into position beside the hook member causing the said slidable link to engage the hook member and thus shorten the belt.

2. In a device of the type described having opposite sections and means for detachably connecting the sections; of an adjustable take-up device in each section, each take-up device comprising a hook member and a closed link member pivoted to the end of the hook member and a link slidably engaging the link member; said hook member being connected at its free end with one part of a belt section, and the link being connected with another part of such belt section; said link member when in one position forming a link of the belt and extending same, and when turned into position beside the hook member causing the slidable link to engage the hook member and thus shorten the belt.

3. In a device of the type described, an adjustable take-up device, comprising a hook-member having a loop at one end and a hook at its other end; a link-member adapted to be connected to one part of the belt and having one end corresponding in contour to the hook end of the hook-member and pivoted to the hook end thereof; and a link adapted to be connected with another part of the belt and slidably engaged with the link-member.

4. An adjustable take-up device for belts, comprising a hook-member formed of wire bent to form a loop at one end and hooked shaped portions at its other end; a link-member adapted to be connected to one part of the belt and formed of wire bent to form parallel loops, one end of each loop corresponding in contour to the hook end of the hook-member and pivoted to such hook end; and a link adapted to be connected with another part of the belt and slidably engaged with the link-member.

5. An adjusting device for belts comprising a hook-member having a loop at one end and a hooked shaped portion at its other end; a link-member adapted to be connected to one part of the belt and having one end corresponding in contour to the hook end of the hook-member and pivoted thereto, said link-member being provided with a handle adjacent its free end; and a link adapted to be connected with another part of the belt and slidably engaged with the link-member.

6. An adjusting device for belts comprising a hook-member formed of a wire bent to form a loop at one end and hooked shaped portion at its other end; a link member adapted to be connected to one part of the belt and formed of wire bent at one end to correspond in contour with the hook end of the hook-member and pivoted to the hook end thereof, said link member being provided adjacent its free end with a handle; and a link adapted to be connected with another part of the belt and slidably engaged with the link-member.

7. An adjusting device for belts comprising a hook-member formed of a wire bent to form a loop at one end and hooked shaped portions at its other end; a link-member adapted to be connected to one part of the belt and formed of wire bent to form parallel side loops, one end of each loop corresponding in contour to the hook end of the hook member and pivoted to the hook end thereof; the said side loops being provided with return bends forming a handle and a link adapted to be connected with another part of the belt and slidably engaged with the link-member.

In testimony that I claim the foregoing as my own, I affix my signature.

JOHN H. DAVIS.